United States Patent
Krueger et al.

(10) Patent No.: US 8,062,175 B2
(45) Date of Patent: Nov. 22, 2011

(54) METHOD AND APPARATUS FOR OPTIMIZING BRAKING CONTROL DURING A THRESHOLD BRAKING EVENT

(75) Inventors: Eric E. Krueger, Chelsea, MI (US); Thomas S. Miller, Lagrange, OH (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 648 days.

(21) Appl. No.: 12/264,338

(22) Filed: Nov. 4, 2008

(65) Prior Publication Data

US 2010/0113214 A1    May 6, 2010

(51) Int. Cl.
*H02P 3/04* (2006.01)
(52) U.S. Cl. .................... 477/29; 477/4; 477/25
(58) Field of Classification Search .............. 477/4, 9, 477/24–26, 28, 29
See application file for complete search history.

(56) References Cited

U.S. PATENT DOCUMENTS

| 2005/0003928 A1* | 1/2005 | Niki et al. ................. 477/5 |
| 2007/0228821 A1* | 10/2007 | Maki et al. ................ 303/151 |
| 2008/0004780 A1* | 1/2008 | Watanabe et al. ........... 701/54 |
| 2008/0042489 A1* | 2/2008 | Lewis et al. ............... 303/152 |
| 2010/0113214 A1* | 5/2010 | Krueger et al. ............. 477/28 |
| 2010/0250083 A1* | 9/2010 | Takahashi et al. .......... 701/70 |

* cited by examiner

*Primary Examiner* — Ha D. Ho
(74) *Attorney, Agent, or Firm* — Quinn Law Group, PLLC

(57) ABSTRACT

A method minimizes a driveline vibration and reduces stopping distances in a hybrid electric vehicle (HEV) having a plurality of drive wheels, a friction braking system having antilock braking system (ABS) capability, and an electronically variable transmission (EVT) with two EVT modes. The method automatically shifts the EVT to a predetermined high speed/low torque EVT mode when the ABS is active and when a calibrated maximum deceleration rate is not exceeded. An HEV has a friction braking system with ABS capability and an EVT including a plurality of modes. A controller automatically activates the friction braking ABS in response to a threshold level of slip between the drive wheels and the road surface when the brake pedal is actuated. An algorithm automatically shifts the EVT into one of the high speed/low torque EVT modes when the ABS is activated and the calibrated maximum deceleration rate is not exceeded.

14 Claims, 2 Drawing Sheets

| ABS | $-\alpha_T^\leq$ | PRESENT EVT MODE | DEFAULT EVT MODE |
|---|---|---|---|
| OFF | - | EVT 1 | - |
| OFF | - | EVT 2+ | - |
| ON | Y | EVT 1 | EVT 2+ |
| ON | Y | EVT 2+ | EVT 2+ |
| ON | N | EVT 1 | - |
| ON | N | EVT 2+ | - |

METHOD AND APPARATUS FOR OPTIMIZING BRAKING CONTROL DURING A THRESHOLD BRAKING EVENT

TECHNICAL FIELD

The present invention relates generally to a method and an apparatus for optimizing braking control of a vehicle, and in particular to reducing driveline vibration and stopping distances by automatically selecting or retaining a default transmission operating mode in a hybrid electric vehicle during a threshold braking event.

BACKGROUND OF THE INVENTION

A hybrid electric vehicle (HEV) selectively utilizes multiple sources of energy in order to improve overall fuel economy, as well as to reduce certain vehicle emissions. An HEV includes a rechargeable energy storage system (ESS), which is ordinarily configured as a battery or a battery pack having a relatively high energy density. The ESS is electrically connected to at least one of the multiple energy sources. The multiple energy sources most often include a gasoline, diesel, or alternative fuel internal combustion engine and at least one electric motor/generator. Other HEV designs may alternately employ a fuel cell and/or another power source in place of or in conjunction with the internal combustion engine in order to further reduce vehicle emissions and improve operating range of the HEV.

In certain HEV designs, the drive wheels remain continuously connected to the driveline of the HEV to enable regenerative braking, thus providing a relatively efficient means of capturing useful braking energy. As is known in the art, regenerative braking can occur when an electric motor/generator is allowed to act as in its capacity as a generator during a regenerative braking event. When acting as a generator, the electric motor/generator can recharge the ESS while concurrently applying a negative torque to the drive wheels, thus slowing the HEV. Likewise, during normal driving operations the electric motor/generator can be operated as a motor, thus drawing power from the ESS and potentially powering the HEV and/or its various onboard systems.

As long as the drive wheels remain in continuous contact with the road surface, noise and driveline vibration are generally minimized within the vehicle interior. However, the coefficient of friction of certain road surfaces may be relatively low, such as on icy, snowy, oily, or wet pavement. The low coefficient of friction surface causes a disparity in the relative rotational speeds of the drive wheels with respect to the vehicle speed, or between the desired output torque and the actual torque imparted to the drive wheels.

In an HEV equipped with antilock braking system or ABS capability, slip occurring between the drive wheels and the road surface when a threshold braking force is applied to a brake pedal causes a controller to automatically activate the ABS. When the ABS is activated, a friction braking system is automatically pumped or cycled at a rapid rate in order to prevent the drive wheels from locking. However, depending on the particular road conditions as quantified by the coefficient of friction of the road surface, a perceptible driveline disturbance or vibration may result during the active ABS braking event, potentially leading to a less than optimal braking feel and performance.

SUMMARY OF THE INVENTION

Accordingly, a transmission control method and apparatus are provided for use in a hybrid electric vehicle (HEV) having an electronically variable transmission (EVT). The HEV includes a friction braking system with antilock braking system (ABS) capability. The method operates in conjunction with both an overall EVT shift control algorithm and an overall electronic braking control algorithm, and is executed via the apparatus during a threshold braking event. As used herein, the term "threshold braking event" refers to any braking event aboard the HEV requiring an automatic activation of the ABS capability, i.e., an "ABS braking event", typically occurring on a road surface having a low threshold coefficient of friction.

In an exemplary HEV having an EVT providing at least a pair of EVT modes and multiple fixed gears, one of the EVT modes is geared or configured for use during low speed/high torque operations, with the other EVT mode or modes geared or configured for progressively higher speed/lower torque operations. As used herein, the low speed/high torque EVT mode is referred to as EVT 1 for simplicity, regardless of the number of higher speed/lower torque EVT modes. The next successive EVT mode is referred to as EVT 2, followed by EVT 3, etc., depending on the configuration of the EVT.

As the HEV negatively accelerates (i.e., decelerates) during active braking an electronic control unit or controller ordinarily defaults, transitions, or shifts to the lowest speed/highest torque EVT mode, or EVT 1, based primarily on the present vehicle speed. However, the ratio of a lowest speed/highest torque EVT mode is such that any resonance imparted by the rapid frictional brake pressure cycling occurring during an active ABS braking event can cause a driveline disturbance. On surfaces having a relatively low coefficient of friction or μ, such as a wet, icy, snowy, and/or oily road surface, such a disturbance may become perceptible within the interior of the HEV, along with reduced stopping distances.

In order to minimize such driveline disturbances on low coefficient of friction surfaces, while at the same time reducing stopping distances on low-μ surfaces, the method of the invention is executed via the apparatus in order to automatically shift the EVT to a default higher speed/lower torque EVT mode, or to retain the EVT in the higher speed mode if already operating in this mode, whenever the threshold braking event is present. In this manner, the method and apparatus can temporarily override a main EVT shift control algorithm by commanding the EVT to shift to and/or remain in the higher speed/lower torque EVT mode for the duration of the threshold braking event. Reduced stopping distances in particular are provided optimizing brake pressure control of the drive wheels in the high speed/lower torque EVT mode. Lower driveline inertia allows the drive wheels to recover to vehicle speed more quickly after brake pressure is released during an ABS event, which allows the pressure to be reapplied more quickly, resulting in optimal braking efficiency.

Within the scope of the invention, a braking input force is applied to a brake input device, usually configured as a brake pedal, and slip is measured between the drive wheels and the road surface. When corresponding braking force and slip thresholds are exceeded, the ABS capability is automatically activated in a process referred to hereinafter as an active ABS braking event, as is well known in the art. An instantaneous or present negative acceleration, i.e., a deceleration, of the HEV is measured during the active ABS braking event, and the EVT is automatically shifted into or locked or retained in a default higher speed/lower torque EVT mode whenever the present deceleration rate is less than a threshold rate during the active ABS braking event, i.e., whenever the vehicle is slowing down more slowly than the calibrated threshold rate. When the present deceleration rate exceeds the calibrated maximum, i.e., whenever the vehicle is slowing down more rapidly than the calibrated threshold rate, the method is finished, and an overall EVT shift control and braking algorithm or algorithms subsequently controls the operation of the HEV in the usual manner.

An HEV is provided having a multi-mode EVT with a friction braking system having ABS capability, as described above. The HEV includes at least one sensor for measuring a level or rate of slip between the drive wheels of the HEV and a road surface, and a controller having an algorithm or a method for selecting a default EVT mode based on a threshold braking event, i.e., an active ABS event combined with a present deceleration rate that is less than a calibrated maximum deceleration rate. The controller executes the method aboard the HEV whenever the threshold braking condition is present by automatically commanding a shift to or retention of the higher speed/lower torque EVT mode, such as EVT 2 or higher. In this manner, any driveline disturbance or vibration, as well as stopping distances, during the active ABS braking event are minimized on a road surface having a low coefficient of friction ($\mu$) while still maintaining a maximum level of torque for a subsequent launch on a higher $\mu$ road surface.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
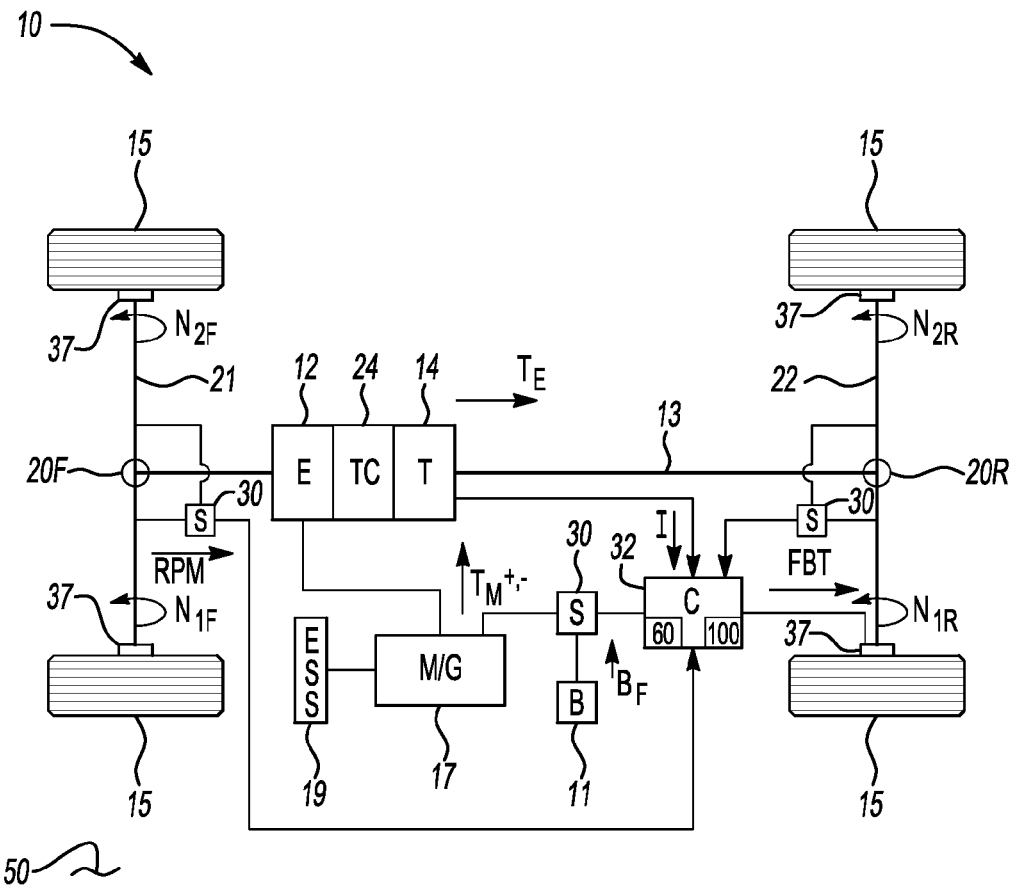
FIG. 1 is a schematic illustration of a hybrid electric vehicle (HEV) in accordance with the invention.
FIG. 2 is a table describing the general default EVT modes usable for controlling the HEV of FIG. 1.

With reference to the Figures, wherein like reference numerals refer to like or similar components throughout the several figures, and beginning with FIG. 1, a hybrid electric vehicle (HEV) 10 is shown that includes an energy conversion system (E) 12, an electrical storage system (ESS) 19, and at least one electric motor/generator (M/G) 17. The energy conversion system 12 can be drivingly connected to an automatic transmission (T) 14 via a hydrodynamic torque converter assembly (TC) 24 as shown, via another torque transfer mechanism such as a clutch, or via a direct connection to a set of drive wheels 15. The HEV 10 includes an electronic control unit or controller 32 having an algorithm or method 100 as described below with reference to FIGS. 2 and 3.

The controller 32 refers broadly to a distributed or central control module, which can include such control modules and capabilities as might be necessary to operate the HEV 10 in the desired manner, including an engine control module, a transmission control module, a battery pack control module, a brake system control module, and a transmission power inverter module. The controller 32 provides overarching control and coordination of the aforementioned controllers. The controller 32 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the controller 32 or accessible thereby, including the algorithm or method 100 of the invention, is stored in ROM and executed to provide the respective functions of each resident controller.

The ESS 19 can be configured as one or more batteries, although other electrical and/or electrochemical energy storage devices having the ability to store electric power and dispense the electric power can be used within the scope of the invention. The ESS 19 can be sized based on factors including regenerative braking requirements, application issues related to typical road grade and temperature, and propulsion requirements such as emissions, power assistance, and electric range. Generally, the ESS 19 is a high voltage direct current (DC) device coupled to a transmission power inverter module (not shown) via sufficiently constructed DC cabling, as will be understood by those of ordinary skill in the art.

The transmission 14 is configured as an electronically variable transmission (EVT) of the type known in the art. For clarity, the transmission 14 is referred to hereinafter as the EVT 14. The EVT 14 has at least two EVT modes and a plurality of fixed gear modes, with the at least two EVT modes referred to hereinafter as EVT 1 and EVT 2. EVT 1 refers to a low speed/high torque mode and EVT 2 refers to a high speed/low torque mode. As will be understood by those of ordinary skill in the art, the EVT 14 can be configured to provide more than two EVT modes, with each additional EVT mode providing progressively higher speeds and lower torque, such as EVT 3, 4, etc. Regardless of the number of EVT modes, EVT 1 is intended herein to refer to the lowest possible speed/highest torque configuration.

Ordinarily, the EVT 14 of FIG. 1 is commanded to remain in or shift to the lowest speed/highest torque mode, i.e., EVT 1, at some point during vehicle deceleration, as EVT mode selection is generally determined as a function of the present or instantaneous vehicle speed (N). That is, EVT 1 is ordinarily used at vehicle speeds below approximately 20 miles per hour, while EVT 2 or higher modes if available are used at progressively higher vehicle speeds, as will be understood by those of ordinary skill in the art.

Still referring to FIG. 1, the energy conversion system 12 can be configured as, for example, a gasoline, diesel, biodiesel, ethanol, or other style of internal combustion engine within the scope of the invention. However configured, the energy conversion system 12 is capable of generating a sufficient amount or level of engine torque ($T_E$) for rotating an output or drive shaft 13 of the HEV 10, which ultimately rotates or powers a respective set of front and/or rear drive axles 21, 22 as needed. In this manner, the HEV 10 is propelled along a road surface 50 via a set of drive wheels 15.

The HEV 10 can also include a front and rear differential 20F, 20R, respectively, allowing the drive axles 21, 22 to independently rotate at different speeds on either side of the HEV 10. That is, the front differential 20F can allow a rotational speed $N_{1F}$ on one side of the HEV 10, and a potentially different rotational speed $N_{2F}$ on the other side of the HEV 10. Likewise, the rear differential 20R can allow a rotational speed $N_{1R}$ on one side of the HEV 10, and a potentially different rotational speed $N_{2R}$ on the other side of the HEV 10. The various speeds $N_{1F}$, $N_{1R}$, $N_{2F}$, $N_{2R}$ are measured via a set of sensors (S) 30 and relayed to the controller 32.

The motor/generator 17 can operate alternately as an electric motor or an electric generator as needed. When operating as an electric motor, the motor/generator 17, which may be a single unit or multiple units depending on the design of the HEV 10, can supply power as needed aboard the HEV 10 and/or for propelling the HEV 10. When operating as a generator, the motor/generator 17 can generate electrical power for recharging the ESS 19. The controller 32 is adapted to route or distribute energy from the motor/generator 17 to the ESS 19 for recharging/storage therein, and/or to distribute the energy to another electrical power unit (not shown), which will be operating as a motor at that time.

The HEV 10 includes a conventional electro-mechanical or hydraulic friction braking system 37, such as a fluid-actuated pad and/or drum style braking system, which is positioned in proximity to each drive wheel 15 and adapted to provide a frictional mechanical braking capability, which can be augmented by the electronic/regenerative braking capability described above. Ordinarily, the friction braking system 37 is the primary or sole braking system when the HEV 10 is traveling at a relatively high rate of speed. When a driver of the HEV 10 depresses the braking input device (B) 11, typically a conventional brake pedal, the friction braking system 37 slows the HEV 10 in one manner, which can be augmented by regenerative braking from the motor/generator 17 as needed.

Still referring to FIG. 1, the HEV 10 is also equipped with an antilock braking system (ABS) of the type known in the art such that the controller 32, using one or more of the sensors 30, can detect or measure a level of slip between the drive wheels 15 and the road surface 50. In response to a threshold amount or level of slip in conjunction with a threshold braking input force ($B_F$) the controller 32 automatically activates the ABS. The controller 32 then rapidly cycles or pumps the friction braking system 37 to prevent the drive wheels 15 from locking, thus preventing the HEV 10 from entering a prolonged skid on the road surface 50.

A vehicle speed (N) can be measured via one or more of the sensors 30 at the drive shaft 13, as well as the speeds of the various drive wheels 15. The front axle 21 can be divided into two independently rotating sides by a front differential 20F, and the rear axle 22 can be divided into two independently rotating sides by a rear differential 20R. There exists at each drive wheel 15 the potential to slip relative to the road surface 50. Therefore, the speeds of the drive wheels 15 are represented in FIG. 1 as $N_{1F}$ and $N_{2F}$ for the potentially different rotational speeds of the two sides of the front axle 21, and $N_{1R}$ and $N_{2R}$ for the potentially different rotational speeds of the two sides of the rear axle 22.

As is known in the control of power transmissions such as the EVT 14, the controller 32 receives the input signals representing a plurality of vehicle performance values from the HEV 10 and the EVT 14, with these signals including but not limited to: engine torque ($T_E$), engine speed in revolutions per minute (RPM), electric motor torque and direction/sign ($T_M^{+,-}$), throttle position or demand, a braking pressure or braking input force ($B_F$) applied to the braking input device 11, the vehicle speed (N), etc. These signals are collected or determined via the one or more sensors 30 and relayed as input signals to the controller 32 via hard wired or wireless means.

The controller 32 can calculate either or both of a slip or speed error between either or both of the drive wheels 15 attached to the respective front and rear axles 21, 22 with respect to the vehicle speed (N). The vehicle performance values are usable by a transmission control algorithm or method 100 that is resident within or accessible by the controller 32 for controlling the mode of the EVT 14 during a predetermined or threshold braking event, as will now be described with reference to FIGS. 2 and 3.

Referring to FIG. 2, a table generally describes the intended default or override modes of the EVT 14 of FIG. 1 depending on the on/off activation status of the ABS and an additional threshold condition, that being a threshold deceleration rate ($-a_T$). When the ABS of the HEV 10 in FIG. 1 is off or deactivated, a main or overall transmission control algorithm (not shown) governs the selection of the appropriate EVT mode or other gear mode in which the EVT 14 presently operates. For example, if the EVT 14 of the HEV 10 in FIG. 1 is operating in either of EVT 1 or EVT 2 absent an active ABS braking event, the controller 32 continues operating in that particular EVT mode unless and until a main transmission control algorithm (not shown) commands a shift or transition to another EVT mode, or to one of the various fixed gear modes.

Figure 3:
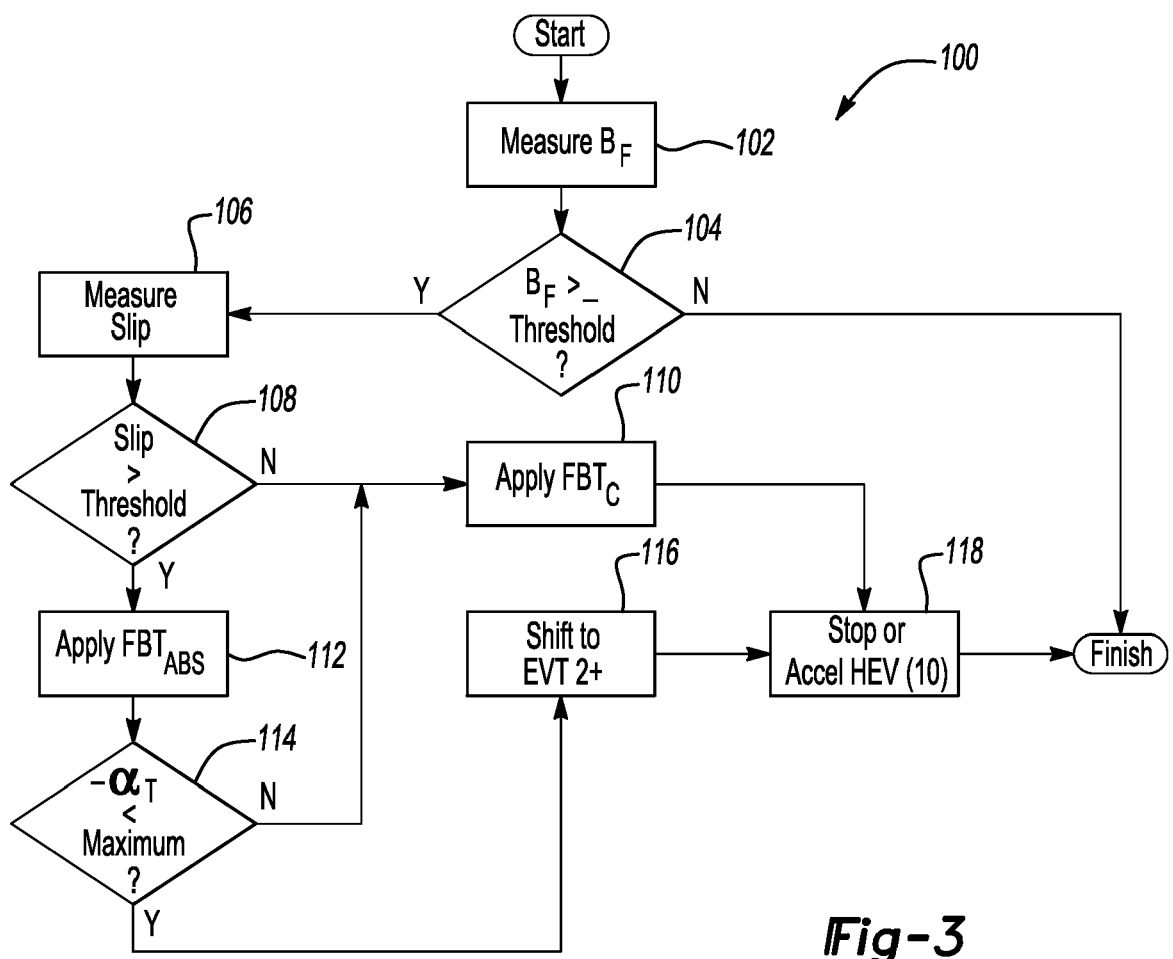
FIG. 3 is a schematic flow chart describing a transmission control algorithm or method usable with the HEV of FIG. 1.

Within the scope of the invention, the method 100 of FIGS. 1 and 3 is executed only during a threshold braking event, i.e., during an active ABS braking event on a road surface 50 (see FIG. 1) having a sufficiently low coefficient of friction (μ). For simplicity, such a surface is referred to hereinafter as a low-μ surface, and can be exemplified by such surfaces as loose gravel, wet, icy, snowy, and/or oily asphalt, concrete, or other pavement or surface. Likewise, a high-μ surface can be exemplified by dry and primarily solid asphalt, concrete, or other pavement. The coefficient of friction (μ) of a given road surface ultimately affects the instantaneous or present deceleration rate of a vehicle such as the HEV 10 of FIG. 1, and therefore a calibrated maximum deceleration rate can be used to set a threshold value for determining when the HEV 10 is braking on a high-μ surface rather than a low-μ surface. That is, when the HEV 10 has a deceleration ($-\alpha_T$) of a magnitude that is less than the calibrated maximum, the HEV 10 is slowing down at a lower rate than the calibrated threshold, indicating a low-μ surface.

In an exemplary embodiment, a calibrated maximum deceleration rate is provided of approximately −0.5 to approximately −0.7 g, with the variable "g" being equal to 9.8 m/s$^2$, can be correlated to a sufficiently high-μ surface, although those of ordinary skill in the art will recognize that other ranges can be provided within the scope of the invention as desired. The method 100 is executed only when the magnitude of the present deceleration rate of the HEV 10 is less than this calibrated maximum deceleration rate, that is, when the HEV 10 is not slowing down quickly enough. In an EVT having just two EVT modes, i.e., EVT 1 and EVT 2, the calibrated maximum deceleration can be the sole determinative value used by the controller 32 in deciding when to execute the method 100, with EVT 2 being the default EVT mode in such an embodiment.

In an EVT providing more than two EVT modes, the default EVT mode can be selected from the multiple available higher speed/lower torque EVT modes (EVT 2, EVT 3, etc.) based on the present deceleration rate, with different deceleration rate thresholds each being less than or equal to the calibrated maximum deceleration rate. For example, in an alternate embodiment a calibrated maximum deceleration rate of approximately −0.5 to −0.7 g executes the method 100 during a threshold braking event, as described above. Icy pavement can correlate to a predetermined or threshold deceleration rate of approximately −0.05 to −0.2 g, while snow covered pavement can correlate to a slightly increased deceleration rate of approximately −0.2 to −0.4 g. Gravel can correlate to a deceleration rate of approximately −0.4 to −0.6 g, with wet pavement correlating to approximately −0.7 g to −1 g. The method 100 can include selecting a default EVT mode (EVT 2, EVT 3, etc.) for various present deceleration rates based on the different thresholds as desired. For example, by setting a −0.2 g threshold, the controller 32 can default to EVT 3 when the present deceleration is greater in magnitude than −0.2 g, defaulting instead to EVT 2 when the present deceleration falls between −0.2 g and the approximately −0.5 to −0.7 g calibrated maximum rate. In this manner, a reduction in driveline disturbances can be affected in different manners for the different pavement types or road surfaces.

In general, according to the method 100 of FIGS. 1 and 3, when automatic entry into an active ABS braking event as determined by the controller 32, the controller 32 determines whether or not the calibrated maximum deceleration rate is exceeded. If the calibrated maximum deceleration rate is not exceeded, a condition corresponding to a relatively low-μ surface as explained above, the controller 32 next determines the present EVT mode. If the EVT mode is EVT 2 or a higher EVT mode, the controller 32 maintains EVT 2 or the higher EVT mode, depending on the configuration of the EVT 14, until the HEV 10 of FIG. 1 arrives at a stop, or until conditions are otherwise such that the ABS can be deactivated.

If EVT 1 is presently active during an active ABS event, and if the calibrated maximum deceleration rate $(-a_T)$ is not exceeded, the relatively low-μ surface is deemed to be present. The controller 32 overrides any commanded value or mode from a main transmission control algorithm (not shown), and commands an immediate upshift or mode transition to a default higher speed/lower torque EVT mode. The upshift can be to EVT 2 in an exemplary two-mode hybrid or to EVT 2, or to a higher EVT mode in a three-mode or higher EVT, as discussed above. The different gear ratios enabled by the higher speed/lower torque EVT modes effectively compensate for any instantaneous output torque error, which can be an undesired result of high torque/low speed EVT mode in conjunction with a low-μ surface. This provides a reduced amount of driveline vibration and enables improved stopping distances during the active ABS braking event on surfaces having a relatively low coefficient of friction.

Referring to FIG. 3, with reference to the various components of the HEV 10 of FIG. 1, the algorithm or method 100 for providing the various default modes of FIG. 2 is explained in more detail. As explained above, the method 100 is executed only during the threshold braking event described above, i.e., during an active ABS braking event producing up to a calibrated maximum deceleration rate $(-a_T)$, i.e., when the HEV 10 is slowing at a rate less than that expected for a relatively high-μ surface. During the threshold braking event, a resonance of the rapid cycling of braking pressure in the friction braking system 37, as represented by the arrow $FBT_{ABS}$ in FIG. 1, can lead to driveline vibration or disturbances on certain low-μ surfaces, since the driveline of the HEV 10 is directly connected to the drive axles. On a rough or high-μ surface such as dry concrete or asphalt, the driveline disturbances are generally lost in the road vibration, and therefore are not readily perceived by a driver of the HEV 10. The method 100 optimizes control of the drive wheels 15 while the HEV 10 is operating in an active ABS braking event on a surface having a sufficiently low coefficient of friction, while still maintaining a maximum available torque for a subsequent launch of the HEV 10 on a surface having a relatively high coefficient of friction.

The method 100 begins at step 102, wherein the controller 32 utilizes the sensors 30 to measure a braking input force $(B_F)$ applied to the braking input device 11. Step 102 can encompass directly measuring the force at the braking input device 11, such as using a pressure transducer, and/or indirectly by measuring the amount and rate of travel of the braking input device 11 within its known range of motion. The method 100 then proceeds to step 104.

At step 104, the braking input force $(B_F)$ from step 102 is compared to a calibrated threshold value to ensure that a threshold amount of braking input force $(B_F)$ is presently applied to the braking input device 11. Step 104 effectively determines the presence of a panic braking event of the type that ordinarily corresponds to an imminent activation of the ABS. If a threshold amount of braking input force $(B_F)$ is determined to be presently applied to the braking input device 11, the method 100 proceeds to step 106. Otherwise, the method 100 is finished.

At step 106, the method 100 measures the amount or level of slip at each of the four drive wheels 15, such as by measuring the rotational speed of each drive wheel 15 in relation to the measured or detected speed (N) of the HEV 10. As will be understood by those of ordinary skill in the art, in an ABS other parameters can also be monitored, such as deceleration rates of the wheels 15, as additional inputs for determining when to activate the ABS. Once the level of slip is known or is otherwise quantified using these inputs, the method 100 proceeds to step 108.

At step 108, the slip measured at step 106 is compared to a threshold amount or level of slip. The threshold slip can be calibrated value stored in the controller 32 or accessible thereby, and which can be indexed by vehicle speed (N) in a lookup table for quick reference. That is, at low vehicle speeds (N) more slip might be permissible within an overall braking control algorithm (not shown), while under high speeds the same amount of slip might surpass the corresponding threshold. If the measured or calculated slip does not exceed the threshold, the method 100 proceeds to step 110. Otherwise, the method 100 proceeds to step 112.

At step 110, a friction braking torque $(FBT_C)$ is applied in the conventional manner in response to the braking input force $(B_F)$ applied to the braking input device 11. The HEV 10 is thus slowed or stopped as needed depending on the braking input force $(B_F)$ and its apply rate. Simultaneously, a regenerative braking torque $(T_M^-)$ may also be applied to slow the HEV 10 and/or to assist the friction braking system 37. The controller 32 continues operation of the EVT 14 in its present EVT mode, i.e., in either of EVT 1 or EVT 2 as shown in FIG. 2. The method 100 then proceeds to step 114.

At step 112, the controller 32 activates an ABS algorithm (not shown) such that an automatically-controlled ABS friction braking torque $(FBT_{ABS})$ is applied and maintained so long as a threshold amount of braking input force $(B_F)$ remains applied to the braking input device 11. The HEV 10 is slowed or stopped as needed depending on the level of braking input force $(B_F)$, with the controller 32 automatically controlling the friction braking system 37. The method 100 then proceeds to step 114.

At step 114, the method 100 includes comparing the magnitude of the present deceleration rate $(-\alpha_T)$ of the HEV 10 to a calibrated maximum rate as described above in order to approximate the coefficient of friction of the road surface 50. If the magnitude of the present deceleration rate is greater than or equal to the calibrated maximum rate, a relatively high-μ surface is deemed to be present, and the method 100 proceeds to step 110. Otherwise, the method 100 proceeds to step 116.

At step 116, having determined at step 114 that braking on a relatively low-μ surface is occurring, the present EVT operating mode is determined, i.e., EVT 1, EVT 2, or a higher EVT mode, whether by referencing a flag or code stored in the controller 32, by calculating or measuring the speed of the HEV 10, and/or using any other known means. If EVT 1 is presently active, the EVT 14 is automatically shifted or transitioned to EVT 2 or higher, as abbreviated EVT 2⁺ in FIG. 3. Depending on the configuration of the controller 32 and the EVT 14, step 116 includes executing an automatic shift to at least one EVT mode higher than EVT 1.

For example, in an EVT 14 having two EVT modes, step 116 will always be a shift from EVT 1 to EVT 2, or the controller 32 will retain the EVT 14 in EVT 2 if the EVT 14 is already in that mode. In an EVT having more than two EVT modes, the controller 32 can cross reference the present deceleration rate to a lookup table 60 of different threshold deceleration rates and select one of the available higher EVT modes depending on the value of the present deceleration rate. For example, in a three-mode EVT, if the deceleration rate comparison at step 114 indicates icy conditions the controller 32 can shift to EVT 3, while if the deceleration rate comparison indicates or corresponds to snowy road conditions the controller 32 can shift to EVT 2. However, it is not necessary to shift to anything higher than EVT 2 within the scope of the invention. The method 100 then proceeds to step 118.

At step 118, the HEV 10 is slowed to a stop, is accelerated, or is otherwise operated in such a way as to deactivate the ABS (see step 112) or the standard or ordinary friction braking event (see step 110). The method 100 is then finished, and the HEV 10 is again operated in conjunction with any existing EVT control algorithm (not shown). Subsequent to exiting the method 100, if the HEV 10 is still moving, such as when the HEV 10 regains traction before stopping during a temporary ABS braking event, the EVT 14 will be in EVT 2 or higher. If the HEV 10 has reached a complete stop, the EVT 10 will be automatically down shifted to EVT 1 for launch in the usual manner.

Using the method 100, driveline vibration is reduced when the HEV 10 of FIG. 1 is braking during an active ABS braking event on surfaces having a sufficiently low coefficient of friction (μ). The method 100 commands a hold of or a transition or shift to EVT 2 or higher, thus providing a lower torque/higher speed EVT mode to render the vibrations less perceptible. Stopping distances are also optimized via the different gearing provided by the higher EVT modes. The inertia of the driveline of the HEV 10, which in EVT 1 would ordinarily cause the speeds of the drive wheels 15 of FIG. 1 to recover to vehicle speed (N) at a relatively slow rate, is compensated for by forcing a shift to EVT 2 or higher, or holding EVT 2 or higher, during the threshold ABS braking event.

While the best modes for carrying out the invention have been described in detail, those familiar with the art to which this invention relates will recognize various alternative designs and embodiments for practicing the invention within the scope of the appended claims.

The invention claimed is:

1. A method of optimizing braking in a hybrid electric vehicle (HEV) having a plurality of drive wheels, a friction braking system having antilock braking system (ABS) capability, and an electronically variable transmission (EVT) having a low speed/high torque EVT mode and at least one high speed/low torque EVT mode, the method comprising:
   detecting an active ABS braking event corresponding to an activation of the ABS capability;
   determining a present deceleration rate of the HEV;
   comparing the present deceleration rate to a calibrated maximum deceleration rate; and
   executing a control action when the active ABS braking event is detected and when the present deceleration rate has a magnitude that is less than a magnitude of the calibrated maximum deceleration rate;
   wherein said control action is one of an automatically shifting of the EVT to the at least one high speed/low torque EVT mode and a retaining of the at least one high speed/low torque EVT mode for a duration of the active ABS braking event.

2. The method of claim 1, including a braking input device, wherein detecting the active ABS braking event includes each of: detecting a threshold braking force applied to said braking input device and measuring a threshold level of slip of at least one of the plurality of drive wheels with respect to a road surface.

3. The method of claim 1, wherein the EVT is a two-mode EVT having the low speed/high torque EVT mode and a single high speed/low torque mode.

4. The method of claim 1, wherein the at least one high speed/low torque EVT mode includes a plurality of progressively higher speed/lower torque EVT modes.

5. The method of claim 4, wherein automatically shifting the EVT to the at least one high speed/low torque EVT mode includes automatically shifting the EVT to a different one of the plurality of progressively higher speed/lower torque EVT modes depending on a value of the present deceleration rate.

6. The method of claim 1, wherein the maximum deceleration rate is less than approximately −0.5 to approximately −0.7 g.

7. A method of optimizing braking in a hybrid electric vehicle (HEV) having a plurality of drive wheels, a friction braking system having antilock braking system (ABS) capability, and an electronically variable transmission (EVT) having a low speed/high torque EVT mode and at least one high speed/low torque EVT mode, the method comprising:
   measuring a plurality of vehicle performance values including: a braking input force and a slip level between the drive wheels and a road surface;
   comparing said plurality of vehicle performance values to corresponding threshold values;
   automatically cycling the friction braking system to thereby activate the ABS capability when each of said plurality of vehicle performance values exceeds a respective one of said corresponding threshold values;
   determining a present deceleration rate of the HEV; and
   automatically commanding an upshift of the EVT from the low speed/high torque EVT mode into the at least one high speed/low torque EVT mode when said ABS is activated and when a magnitude of said present deceleration rate is less than a magnitude of a calibrated maximum deceleration rate.

8. The method of claim 7, wherein the at least one high speed/low torque EVT mode includes a pair of high speed/low torque EVT modes, the method further comprising:
   accessing a lookup table containing a threshold deceleration rate that is lower in magnitude than said calibrated maximum deceleration rate, said lookup table being indexed by a speed of the HEV;
   comparing said present deceleration rate to said threshold deceleration rate;
   selecting one of said pair of high speed/low torque EVT modes when a magnitude of said present deceleration rate exceeds a magnitude of said threshold deceleration rate; and
   selecting the other of said pair of high speed/low torque EVT modes when said magnitude of said present deceleration rate is less than said magnitude of said threshold deceleration rate.

9. The method of claim 7, wherein the EVT is a two-mode EVT having a single high speed/low torque EVT mode as the at least one high speed/low torque EVT mode.

10. The method of claim 7, wherein said calibrated maximum deceleration rate is approximately −0.5 to −0.7 g.

11. A hybrid electric vehicle (HEV) having a friction braking system with antilock braking system (ABS) capability and an electronically variable transmission (EVT) having a plurality of EVT modes, the plurality of EVT modes including a low speed/high torque EVT mode and at least one high speed/low torque EVT mode, the HEV comprising:

a plurality of drive wheels for propelling the HEV with respect to a road surface;

a brake pedal configured to receive a threshold braking input force;

a friction braking system adapted to slow the HEV in one manner in response to an application of said threshold braking input force to said brake pedal; and a controller adapted to activate the ABS capability to automatically cycle the friction braking system in response to a threshold level of slip between said drive wheels and said road surface when said threshold braking input force is present, thereby slowing the HEV in another manner; and at least one sensor adapted to measure a dynamic value used for determining a present deceleration rate of the HEV;

wherein said controller has an algorithm adapted to automatically shift the EVT from the low speed/high torque EVT mode into the at least one high speed/low torque EVT mode when the ABS capability is activated and when said present deceleration rate has a magnitude that is less than a magnitude of a calibrated maximum deceleration rate, and to automatically retain the EVT in the at least one high speed/low torque EVT mode when the ABS capability is activated while the EVT is already operating in said at least one high speed/low torque EVT mode.

12. The HEV of claim 11, wherein the EVT is a multi-mode EVT having a first EVT mode adapted for use as the low speed/high torque EVT mode, a second EVT mode adapted for use as one of the at least one high speed/low torque EVT modes, and at least one additional high speed/low torque EVT mode adapted for use as another of the at least one high speed/low torque EVT modes, said at least one additional high speed/low torque EVT mode being adapted for use at a higher speed and a lower torque than the second EVT mode;

wherein said algorithm is adapted to automatically shift the EVT into one of said second EVT mode and said at least one additional high speed/low torque EVT mode depending on a value of said present deceleration rate.

13. The HEV of claim 11, wherein the EVT is a two-mode EVT having a first EVT mode adapted for use as the low speed/high torque EVT mode, and having a second EVT mode adapted for use as the at least one high speed/low torque EVT mode.

14. The HEV of claim 11, wherein said calibrated maximum deceleration rate is approximately −0.5 to approximately −0.7 g.

\* \* \* \* \*